United States Patent [19]

Sullivan

[11] 4,307,487
[45] Dec. 29, 1981

[54] WAX APPLICATOR FOR DEFEATHERING FOWL

[76] Inventor: Terry B. Sullivan, 4932 Arundel Ct., San Jose, Calif. 95136

[21] Appl. No.: 112,129

[22] Filed: Jan. 14, 1980

[51] Int. Cl.³ .............................................. A22C 21/04
[52] U.S. Cl. ................................. 17/11.1 A; 17/1 DA
[58] Field of Search ............... 17/1 D, 1 DA, 11.1 A, 17/45; 15/121, 245, 260, 3.17, 3.16

[56] References Cited

U.S. PATENT DOCUMENTS

| | | | |
|---|---|---|---|
| 2,326,162 | 8/1943 | O'Connor et al. | 17/11.1 A |
| 2,392,208 | 1/1946 | Wilken | 15/260 UX |
| 3,562,841 | 2/1971 | Royalty | 15/121 X |

FOREIGN PATENT DOCUMENTS 435594  9/1935  United Kingdom .................. 15/260

OTHER PUBLICATIONS

"Poultry Wax Heater Improved", p. 92, *Electrical World*, Feb. 10, 1940.

Primary Examiner—Willie G. Abercrombie
Attorney, Agent, or Firm—Harry E. Aine; Harvey G. Lowhurst

[57] ABSTRACT

In a wax applicator for defeathering fowl, a pot is provided for containing a waxy composition into which the fowl to be defeathered is immersed for coating of the feathers with molten waxy material. A squeegee, preferably in the form of a centrally apertured and radially slotted rubber diaphragm, is disposed over the molten liquid material in the pot for ruffling the feathers of the fowl as it is pushed through the squeegee into the waxy material and for squeegeeing the excess molten waxy material from the fowl as the coated fowl is withdrawn from the pot. An outwardly flared support structure is disposed over the open end of the pot for holding the coated fowl and for draining the excess molten waxy material from the fowl back into the pot. The support structure is preferably hinged to the side walls of the pot such that the flared support structure pivots downwardly for storage in coaxial relation to the side walls of the pot.

12 Claims, 3 Drawing Figures

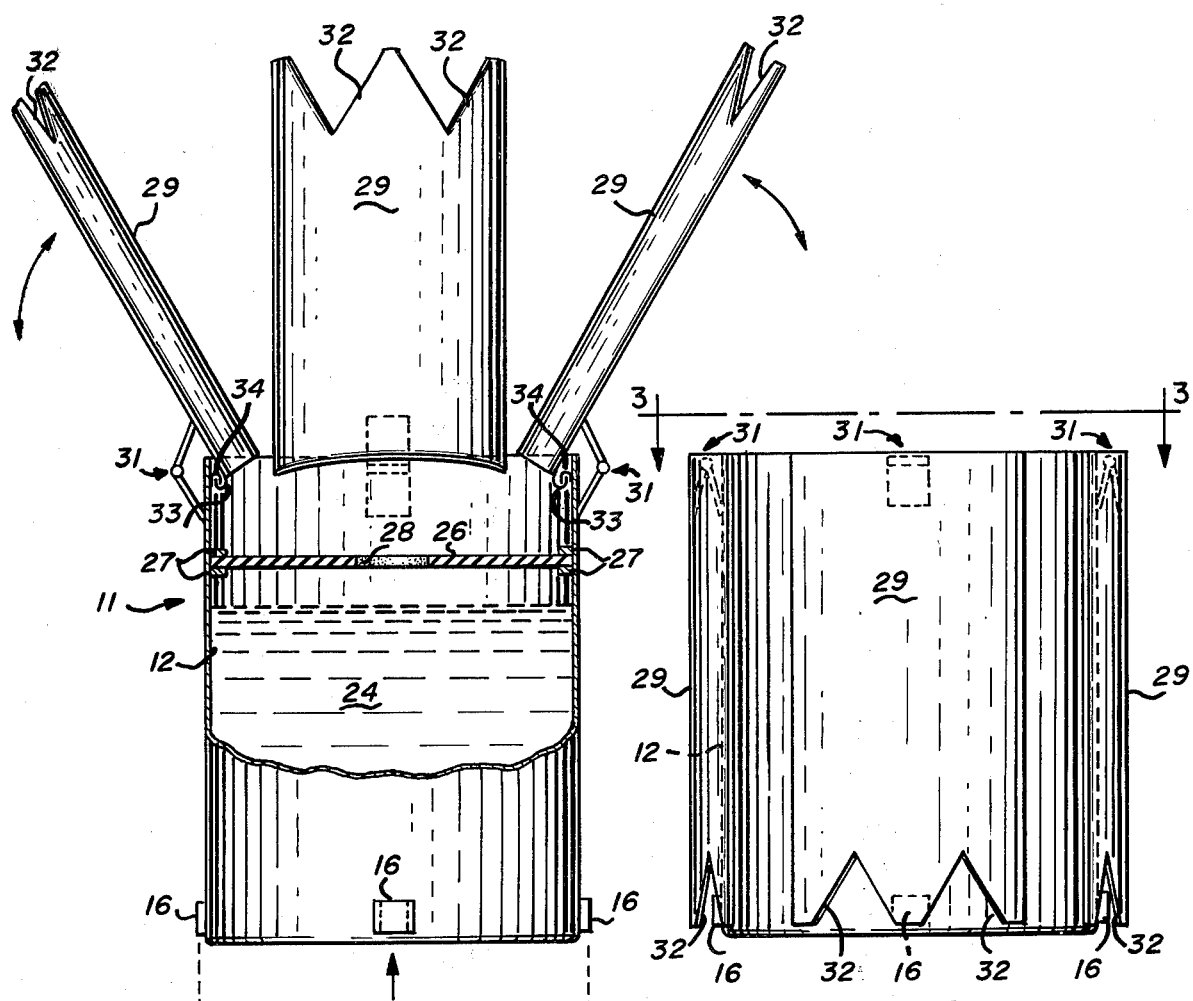
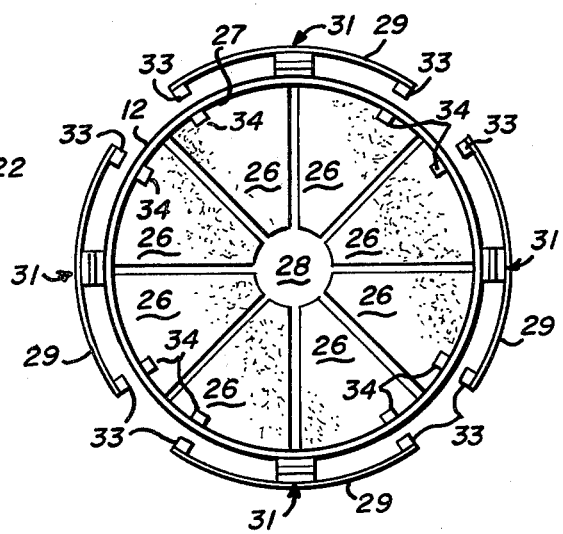
Fig_1
Fig_2
Fig_3

WAX APPLICATOR FOR DEFEATHERING FOWL

BACKGROUND OF THE INVENTION

The present invention relates in general to wax applicators for defeathering fowl and, more particularly, to such applicators which are particularly suited for use by hunters for defeathering wild game birds.

DESCRIPTION OF THE PRIOR ART

Heretofore, it has been customary to provide a pot of molten paraffin for use by hunters in defeathering wild game birds. In use, the pot is heated so as to melt the paraffin. The game birds are then dipped into the molten paraffin and hung by the neck from a peg or the like for draining and cooling thereof. After the molten material has solidified, the waxy material is cracked and pealed from the fowl for removing the feathers.

It is also known from the prior art relative to defeathering poultry for market to provide a combined hot water scalding and wax defeathering pot with an integral heating and temperature control unit. After the birds have been scalded, a wax containing pot is inserted into the pot of hot water for melting the wax and for holding the wax at a temperature determined by the heated water in the scalding pot. The birds are then immersed in the molten wax and the wax allowed to cool. The wax is then pealed from the bird to remove the feathers. The wax pieces containing the feathers are then collected in a strainer which is lowered into the pot of molten wax for melting the wax from the feathers. The strainer is then removed to separate the feathers from the wax. Such an apparatus is disclosed in U.S. Pat. No. 2,326,162 issued Aug. 10, 1943. A suitable wax composition for defeathering birds is disclosed in U.S. Pat. No. 2,353,869, issued July 18, 1944.

SUMMARY OF THE PRESENT INVENTION

The principal object of the present invention is the provision of an improved wax applicator for defeathering fowl and, more particularly, to such an apparatus particularly useful for defeathering game birds.

In one feature of the present invention, a squeegee is operatively associated with the pot containing the molten wax such that when the wax coated fowl is passed through the squeegee the excess molten waxy material is removed from the fowl.

In another feature of the present invention, the squeegee preferably comprises a plurality of flexible resilient fingers projecting from a support toward a passageway through which the coated fowl passes for squeegeeing the excess waxy molten material from the coated fowl and for returning the excess waxy material to the pot.

In another feature of the present invention, an outwardly flared support means is operatively associated with the pot for holding the coated fowl above the pot and for draining excess molten waxy composition from the coated fowl back into the pot.

In another feature of the present invention, the fowl support structure is preferably outwardly flared and hinged to the pot so that when the pot is not in use the support structure can be folded back along the outside walls of the pot for storage.

Other features and advantages of the present invention will become apparent upon a perusal of the following specification taken in connection with the accompanying drawings wherein:

BRIEF DESCRIPTION OF THE DRAWINGS

FIG. 1 is an exploded side elevational view, partly broken away and partly in line diagram form, depicting a wax applicator for defeathering fowl incorporating features of the present invention, FIG. 2 is a view similar to that of FIG. 1 depicting the fowl support structure in a folded state for storage, and FIG. 3 is a top view of the structure of FIG. 2 taken along line 3—3 in the direction of the arrows.

DESCRIPTION OF THE PREFERRED EMBODIMENTS

Referring now to FIG. 1 there is shown a wax applicator 11 useful for defeathering game birds and incorporating features of the present invention. The wax applicator 11 includes a generally cylindrical pot 12, as of sheet metal such as aluminum or steel. The pot includes a detachable heating unit 13A or 13B. In the case of heating unit 13A, the heating unit includes an electrical resistance heating element of conventional design contained within a pancake shaped housing 14. The housing 14 includes a plurality of upstanding peripheral tabs 15 to be received within channel members 16 affixed near the lower end of the pot at a plurality of points about the periphery thereof in registration with the tabs 15. The electrical heating element includes a cord 17 and plug 18 of conventional design for electrically connecting the heating unit 13A to an electrical outlet.

In the alternative heating unit 13B, the pancake shaped housing 14 includes an annular gas burner element 19 of conventional design supplied with gas from a propane tank via a suitable conduit 21. The pancake shaped housing unit 14 includes a plurality of peripheral upstanding tabs 22 each tab being received within a respective channel member 16. Each tab 22 includes an external shoulder portion 23 for resting against the lower end of the respective channel member 16 for holding the bottom of the pot 12 in spaced relation from the burner 19 to permit the hot burning gasses to exhaust around the bottom of the pot 12. The pot includes a charge of waxy material 24, as of paraffin, for coating the feathers of the fowl to be defeathered.

A squeegee element 25 is disposed within the pot 12 above the liquid level of the molten charge material 24. In a preferred embodiment, the squeegee element 25 comprises a plurality of sector shaped resilient fingers 26 (see FIG. 3) affixed at their outer peripheral portions to the inside wall of the pot 12 via the intermediary of a pair of axially spaced coaxial clamping rings 27 which serve to clamp the root portions of the sector shaped fingers 26 together. The ring members 27 are affixed as by rivets or screws to the side walls of the pot 12. The inner ends of the sector shaped fingers 26 define the periphery of a central passageway 28 through which the game bird or fowl is pushed into the molten waxy charge material 24 for coating of the feathers with the waxy material.

In a typical example, the squeegee fingers 26 are made of a resilient flexible material such as rubber having a thickness as of $\frac{3}{8}$ inch thick. As the fowl is pushed through the central passageway 28, which is dimensioned in cross section to be smaller than the cross sectional dimensions of the fowl to be defeathered, the inner ends of the fingers 26 serve to ruffle the feathers of the fowl. After the fowl has been immersed in the molten waxy charge 24 it is withdrawn through the passageway 28. In the withdrawal process, the inner ends of the fingers 26 serve to squeegee the excess molten waxy material from the fowl.

An outwardly flared support structure 29, similar to sections of a funnel, are hinged at 31 near the lip of the pot 12. The outer ends of the outwardly flared support elements 29 are notched at 32 to receive the neck portion of the coated fowl for holding and supporting the fowl above the pot 12. The outwardly flared support structure permits the excess molten waxy material, which drains from the coated fowl, to drain back into the pot 12.

Each of the outwardly flared support members 29, of cylindrical section, includes a pair of hook members 33 projecting from the inner end of the flared elements toward the lip of the pot 12 and which are received within down turned hook portions 34 carried from the inside wall of the pot near the lip thereof. The interlocking hook members 33 and 34 serve as a latch for latching the outwardly flared support structures 29 in their outwardly flared positions for use. In storage, the individual support elements are pushed inwardly to decouple the mating hook portions 33 and 34 and then swung outwardly about the hinge 31 for storage along the outer side walls of the pot 12 in the manner as shown in FIGS. 2 and 3.

In use, the pot 12 is loaded with a charge 24 of waxy material, such as paraffin, the support structures are folded up into the outwardly flared position as shown in FIG. 1 and latched in that position by means of the mating hook portions 33 and 34. The heating element 13A or 13B is then suitably energized for melting the charge material 24.

The fowl is then partially picked to expose certain portions of the skin and the wings and feet are preferably removed. The game bird is then pushed through the central passageway for ruffling its feathers and then for immersing the fowl in the molten charge material 24 for coating thereof. The wax coated fowl is then pulled back through the central passageway 28 for squeegeeing off the excess molten waxy material which then drains back from the squeegee fingers 26 into the pot 12.

The squeegeed fowl is then hung by the neck in the notches 32 for allowing further excess waxy material to drain from the fowl via the funnel shaped support structure 29 into the pot 12. The wax coated fowl are then preferably dunked in cold water for solidifying the waxy material and the waxy material is then cracked and peeled from the birds for removing the feathers. After the birds have been processed, the heating unit 13 is deenergized and the support structures 29 are delatched and folded back against the side walls of the pot for storage.

The advantage to the wax applicator 11 for defeathering game birds of the present invention is that it provides a compact efficient wax applicator device which squeegees the excess material from the game bird and which provides a convenient way for supporting and permitting the excess molten waxy material to drain back into the pot 12.

What is claimed is:

1. In an apparatus for defeathering fowl:
pot means for containing a molten waxy material into which the fowl to be defeathered is to be at least partially immersed for coating of the feathered fowl with the molten waxy material contained within said pot means;
heater means operatively associated with said pot means for maintaining said waxy material in a molten state; and
squeegee means operatively associated with said pot means for squeegeeing excess molten waxy material from the wax coated feathered fowl.

2. The apparatus of claim 1 wherein said squeegee means includes means for returning the squeegeed excess molten waxy material to said pot means.

3. The apparatus of claim 1 wherein said squeegee means includes a plurality of flexible resilient finger portions through which the wax coated fowl is passed for squeegeeing the excess waxy material from the wax coated fowl.

4. The apparatus of claim 3 wherein said finger portions are sector shaped and project from a support toward a passageway through which the wax coated fowl passes from said pot means.

5. The apparatus of claim 1 wherein said squeegee means includes a passageway through which the fowl passes in a first direction into the molten waxy material in said pot means for ruffling the feathers of the fowl prior to coating thereof and through which the coated fowl passes in a second direction for squeegeeing excess molten waxy material from the wax coated fowl.

6. In an apparatus for defeathering fowl:
pot means for containing a waxy material into which the fowl to be defeathered is to be at least partially immersed for coating of the feathered fowl with molten waxy material contained within said pot means; and
support means operatively associated with said pot means for holding the wax coated fowl above said pot means and for draining excess molten waxy material from the wax coated fowl back into said pot means.

7. The apparatus of claim 6 wherein said support means includes an outwardly flared portion for projecting above and extending outwardly from the open end of said pot means for funneling the excess molten waxy material draining from the wax coated fowl back into said pot means.

8. The apparatus of claim 7 wherein said outwardly flared portions of said support means comprise a plurality of sections and including means for storing said sections, when not in use, around and externally of the upstanding side walls of said pot means.

9. The apparatus of claim 8 including hinge means for hinging said sections to said pot means.

10. The apparatus of claim 9 including latch means for latching said sections to said pot means in said outwardly flared position relative to said pot means.

11. In an apparatus for defeathering fowl:
pot means for containing a waxy material in which the fowl to be defeathered is to be at least partially immersed for coating of the feather fowl with molten waxy material contained within said pot means;
squeegee means operatively associated with said pot means for squeegeeing excess molten waxy material from the wax coated feathered fowl; and
support means operatively associated with said pot means for holding the wax coated fowl above said pot means and for draining excess molten waxy material from the wax coated fowl back into said pot means.

12. The apparatus of claim 11 wherein said squeegee means includes a plurality of flexible resilient finger portions through which the coated fowl is passed for squeegeeing the excess waxy material from the wax coated fowl; and
  wherein said support means includes an outwardly flared portion for projecting above and extending outwardly from the open end of said pot means for funneling the excess molten waxy material and draining from the wax coated fowl back to said pot means.

* * * * *